United States Patent Office 2,977,747
Patented Apr. 4, 1961

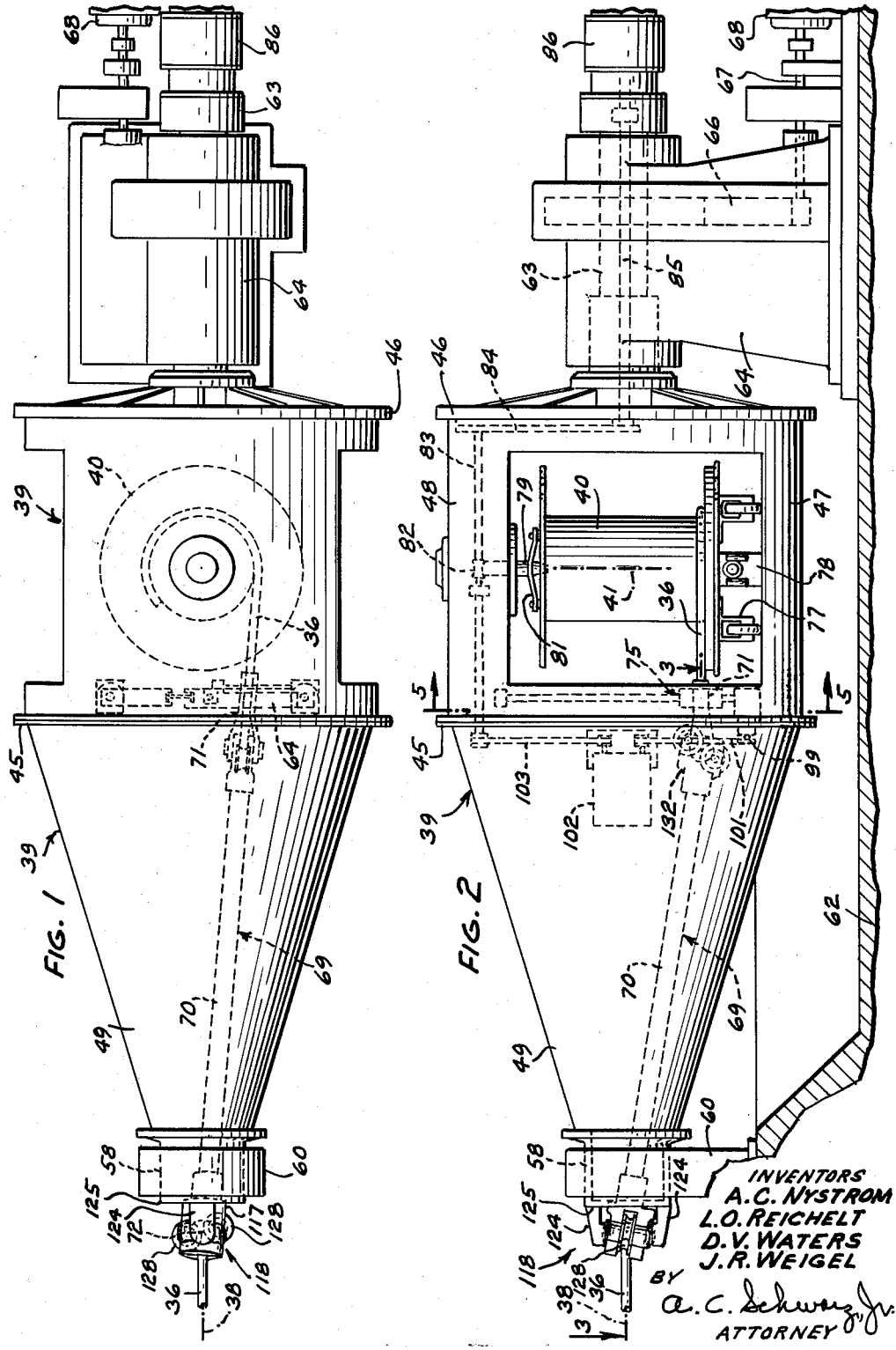

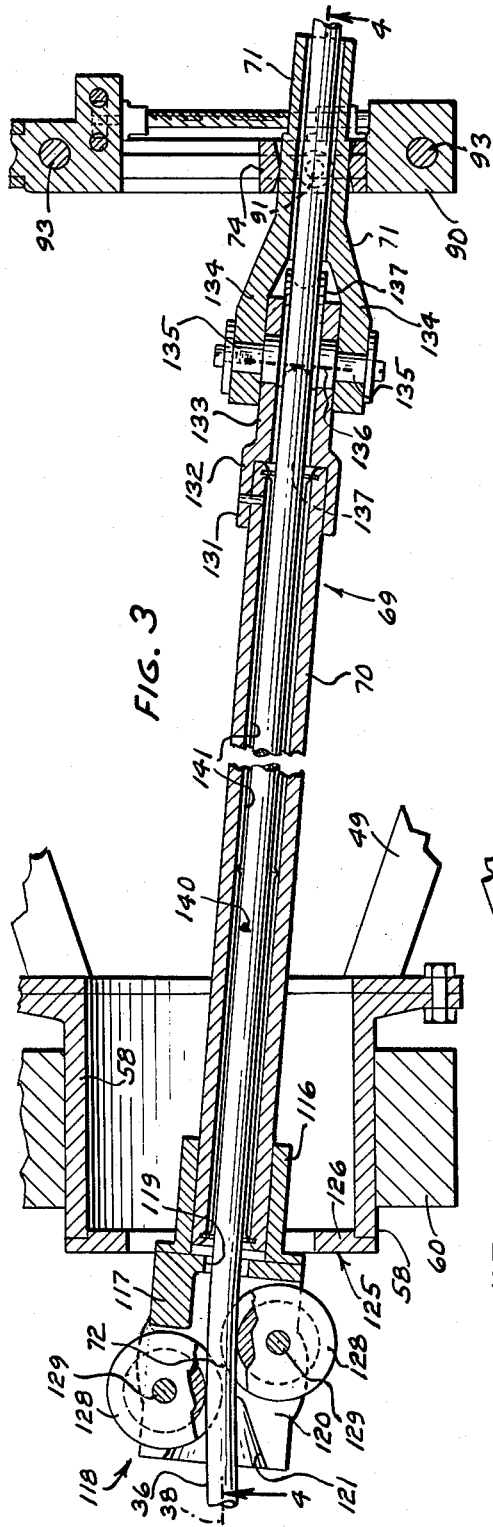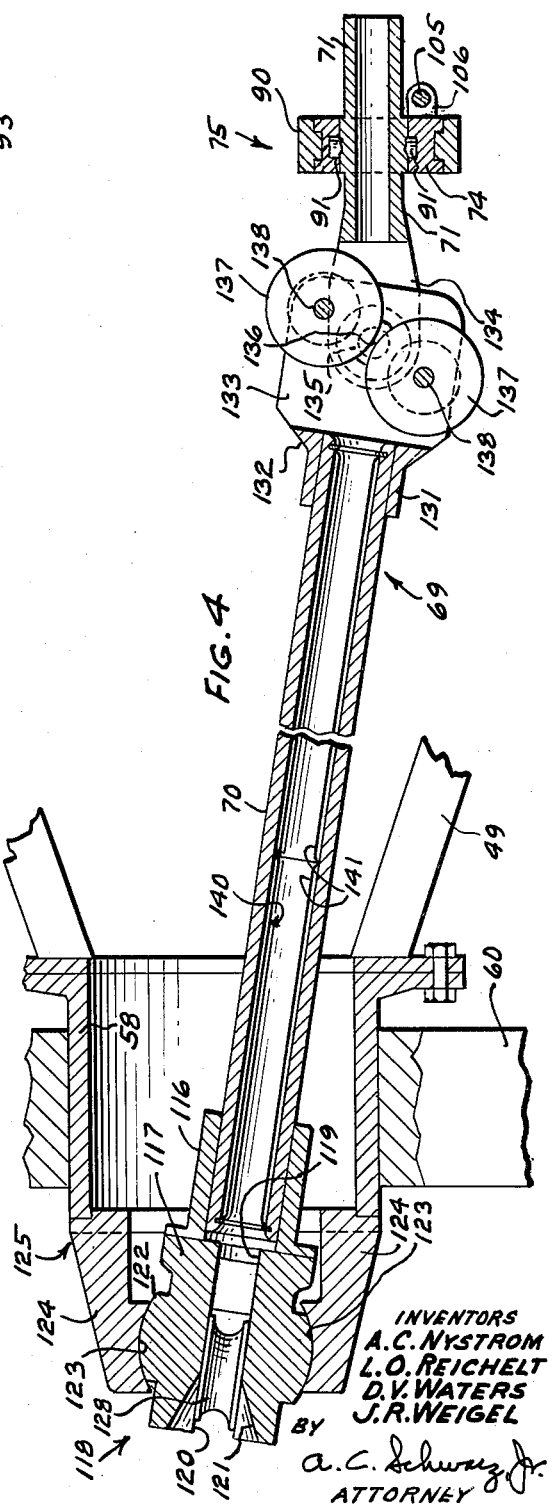

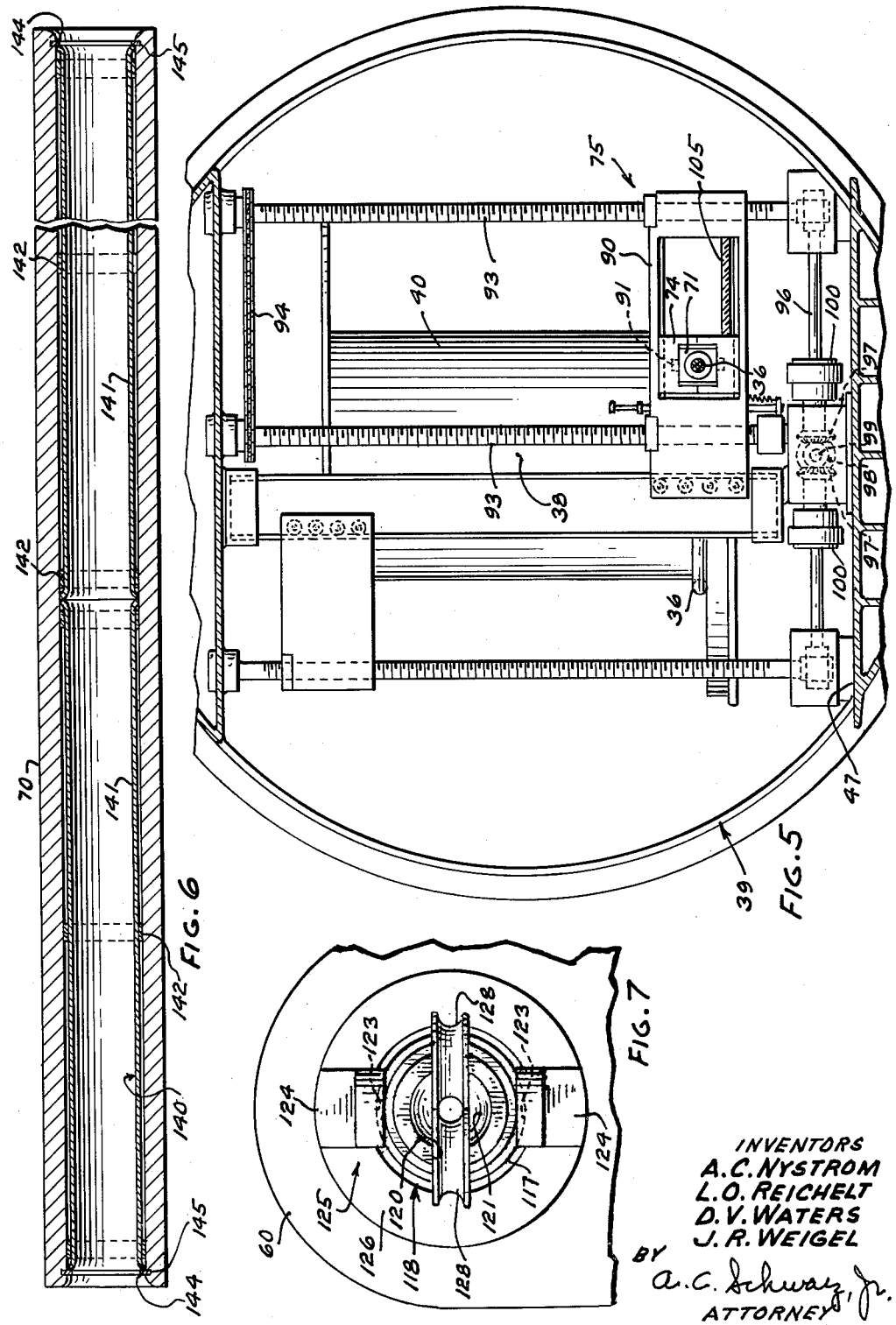

2,977,747

CABLE-GUIDING MECHANISM FOR CABLE-STRANDING APPARATUS

Axel C. Nystrom, Rutherford, N.J., Lester O. Reichelt, Downers Grove, Ill., Daniel V. Waters, Lebanon, N.J., and John R. Weigel, Elmhurst, Ill., assignors, by direct and mesne assignments, to Western Electric Company, Incorporated, New York, N.Y., a corporation of New York Filed July 10, 1959, Ser. No. 826,225

8 Claims. (Cl. 57—66.5)

This invention relates to cable-guiding mechanism for cable-stranding apparatus and more particularly to a movable guide tube on the apparatus for guiding the cable onto a take-up reel.

An object of the present invention is to provide an improved cable-guiding mechanism for cable-stranding apparatus.

Another object of the invention is the provision of a composite guide tube mounted on a rotatable cradle of a cable-stranding apparatus for receiving the cable as it enters the cradle and for guiding the cable to a distributor for distribution thereby onto a take-up reel on the cradle.

A mechanism illustrating certain aspects of the invention may include a cradle mounted for rotation about a horizontal axis along which a cable is formed and having a cable take-up reel mounted thereon with the reel axis perpendicular to the horizontal axis for winding the cable thereon and to advance the cable. A composite cable-guide tube is swivelly supported at one end on one end of the cradle for universal movement about the horizontal axis to receive the cable as it enters the cradle, and at its other end, the composite tube has an articulated tubular guide which is supported on a distributing member of a cable-distributing mechanism and which is moved with the distributing member through paths parallel to the reel to guide the cable evenly onto the reel.

Other objects and advantages of the invention will become apparent by reference to the following detailed description and the accompanying drawings, wherein:

Fig. 1 is a fragmentary plan view of a cable-stranding apparatus showing the cable-guiding mechanism thereon;

Fig. 2 is a fragmentary side elevational sectional view of the apparatus and cable-guiding mechanism shown in Fig. 1;

Fig. 3 is an enlarged fragmentary horizontal sectional view of the cable-guiding mechanism taken on line 3—3 of Fig. 2;

Fig. 4 is a vertical longitudinal sectional view of the cable-guiding mechanism taken on the line 4—4 of Fig. 3;

Fig. 5 is an enlarged fragmentary vertical cross-sectional view through the apparatus taken on line 5—5 of Fig. 2;

Fig. 6 is an enlarged fragmentary longitudinal sectional view of the main tubular section of the cable-guiding mechanism; and Fig. 7 is an enlarged fragmentary end view of the cable-guiding mechanism.

In the present cable-stranding apparatus, a cable 36 (Fig. 1) is formed from a plurality of insulated conductors and is advanced along a substantially horizontal axis 38 into one end of a cradle 39 and onto a take-up reel 40. This reel is supported on the cradle 39 for rotation about the reel axis 41 to wind the cable 36 thereon and for rotation with the cradle about the horizontal axis 38 to impart a predetermined twist to the cable.

The cradle 39 is a hollow structural shell having a pair of circular vertically disposed walls 45 and 46 and a pair of vertically spaced frame members 47 and 48 extending horizontally between the walls 45 and 46 for receiving the reel 40 therebetween, the lower frame member 47 forming a platform on which the reel 40 is supported. A tapering end portion 49 extends from the plate 45 and has a hollow journal 58 secured thereto which is rotatably supported in a pedestal 60 mounted on a base 62. A hollow journal 63 fixed to the frame plate 46 of the cradle 39 is rotatably supported in a pedestal 64 on the base 62 and is connected through a train of gears 66 and a drive shaft 67 to a driving motor 68 by means of which the cradle 39 and the take-up reel 40 are rotated about the horizontal axis 38.

The base 62 has a pit formed therein for receiving a portion of the cradle 39, the upper surface of the base being substantially flush with the upper surface of the platform 47 of the cradle 39 when the cradle is in its loading position to permit the loading of an empty reel 40 onto the cradle and the removal of a full reel therefrom.

As the cable 36 moves into the cradle, it enters a movable composite cable-guide tube 69 which comprises a pair of articulated tubular sections 70 and 71. The composite guide tube 69 is swivelly supported at one end by the hollow journal 58 for universal movement about a point on the horizontal axis 38 and is pivotally supported at its other end on a distributing member 74 of a cable-distributing mechanism 75 for guiding the cable 36 evenly onto the reel 40 in successive layers.

The reel 40 is rotatably and permanently mounted on a truck 77 which supports the reel when the reel and reel truck are removed from the cradle and cooperates with the reel to form a reel and reel truck unit. When the reel and reel truck unit is in the cradle 39, it is supported on a positioning device 78 on the platform 47 of the cradle with the reel 40 supported thereby for rotation relative to the truck. The upper end of the reel 40 has a socket for receiving the end of a reel clamping and driving shaft 79 which is rotatably mounted in the horizontal frame member 48 of the cradle 39 and is actuated axially into engagement with the reel by suitable mechanism for clamping the reel onto the positioning device 78 and cooperating with the device to support the reel for rotation. A cross arm 81 (Fig. 2) on the shaft 79 establishes a driving connection with the reel 40, and the shaft 78 is rotated by suitable mechanism including a pair of spiral gears 82, a shaft 83, a chain and sprocket connection 84 and a shaft 85 which is rotatably supported in the hollow journal 64 and is connected to a motor 86. The housing of the motor 86 is secured to the end of the hollow journal for rotation with the cradle 39 and the motor 86 serves to rotate the reel 40 and to actuate the cable-distributing mechanism 75.

As shown in Fig. 5, the cable-distributing mechanism includes a carriage 90 for supporting the distributing member 74 thereon for transverse sliding movement. The tubular guide section 71 of the composite guide tube 69 extends through an aperture in the distributor member 74 and has a pair of vertically disposed trunnions 91 journaled in bearing apertures in the distributing member 74 for connecting the tubular guide section 71 to the distributor member for pivotal movement about an axis passing through the trunnions 91 in parallel relation to the axis 41 of the reel 40. The carriage 90 is mounted on a pair of traversing screws 93 supported on the cradle 39 in parallel relation to the axis of the reel 40 and the carriage is reciprocated by the traversing screws 93 through a predetermined distance in parallel relation to the reel.

The traversing screws 93 are connected together for simultaneous actuation by a chain and sprocket connection 94 and one of the traversing screws is connected through a pair of helical gears to a horizontal countershaft 96. A pair of bevel gears 97 rotatably mounted on the countershaft 96 mesh with a bevel gear 98 on a drive shaft 99 and are adapted to be connected to the countershaft through selectively operable magnetic clutches 100 which are actuated in response to movement of the carriage 90 through a predetermined stroke to effect the reversal of rotation of the countershaft 96 and the reciprocation of the distributing carriage 90. The drive shaft 99 (Fig. 2) is connected through a sprocket and chain connection 101 to the output shaft of a change-speed gear mechanism 102, the input shaft of which is driven through a chain and sprocket connection 103 from the horizontal drive shaft 83.

At the end of each traverse of the carriage 90, the distributing member 74 is moved one step thereon outwardly from the reel 40 by a suitable mechanism including a lead screw 105 cooperating with a nut 106 on the distributing member 74 to guide the cable 36 tangentially onto the preceding layer of cable 36 wound on the reel 40. The cable-distributing mechanism is more fully disclosed in co-pending application of Reichelt et al. entitled "Cable-Distributing Mechanism for Cable-Stranding Apparatus," Serial No. 826,153, filed July 10, 1959.

Referring now to Figs. 1-4, the cable-guide tube 69 as previously stated comprises a pair of articulated tubular sections 70 and 71. At its forward end, the tubular section 70 is slidably mounted for limited oscillatory and axial movements within a sleeve 116 which is secured to and forms a part of a movable ball member 117 of a ball and socket joint 118. The member 117 has a passageway 119 therethrough (Figs. 3 and 4), a portion of which forms a transverse slot 120 and another portion of which forms an enlarged or flared entrance 121 for the passage of the cable 36 thereinto.

A pair of outwardly directed convex spherical surfaces 122 are formed on opposite sides of the ball member 117 which spherical surfaces engage conforming concave spherical surfaces 123 on a pair of arms 124 of a supporting socket member 125 of the ball and socket joint 118. The socket member 125 has an annular portion 126 which is secured to the end of the hollow journal 58 for rotation therewith and provides clearance for universal movement of the movable ball member 117. The ball and socket joint 118 permits the guide tube 70 to be swivelled about the point 72 which is the center of the ball and socket joint 118 and is located on the horizontal axis 38.

A pair of rollers 128 are mounted on the movable member 117 in the transverse slot 120 therein equidistant from and on opposite sides of the center 72 for rotation about supporting pins 129. Grooved spherical surfaces of the rollers support the cable 36 in substantial coaxial alignment with the horizontal axis 38 and the axis of the tubular section 70.

At its opposite end, the tubular section 70 is fixed to a sleeve portion 131 of a connector member 132 having a pair of parallel plates 133 spaced apart on opposite sides of the axis of the tubular section 70 for passage of the cable 36 therebetween. The plates 133 fit between connector arms 134 formed on one end of the tubular section 71 of the composite guide tube 69 and are pivotally connected thereto by pivot pins 135 for pivotal movement about the axis 136 of the pins 135. Thus the tubular sections 70 and 71 are supported for pivotal movement relative to each other about the axis 136 and for movement together in a plane parallel to the axis 41 of the reel 40 and passing through the center point 72 on the horizontal axis 38 at one end of the composite guide tube 69 and through the axis of the trunnions 91 on the tubular section 71 at the other end of the composite guide tube. A pair of rollers 137 mounted between the plates 133 of the connector member 132 and equidistant from and on opposite sides of the pivotal axis 136 for rotation about pins 138 mounted in the plates 133. The rollers 137 have peripheral grooves in which the cable 36 is supported in coaxial relation with the axes of the tubular sections 70 and 71 as the cable advances from one section into the other.

As shown particularly in Figs. 3, 4 and 6, the main section 70 of the composite cable-guide tube 69 is provided with a tubular liner 140 having a smooth inner surface for supporting the cable 36. This liner is made in sections 141 which are supported within the tubular sections 70 by spacer rings 142 that are bonded to the liner sections 141 in axially spaced relation to each other and engage the tubular section 70. The ends of the liner sections 141 which are disposed in abutting relation to one another are flared to form rounded cable-guiding surfaces. Split retaining rings 144 seated in annular grooves 145 in the end portions of the tubular section 70 and engaging the ends of the outer liner sections 141, hold the liner sections 141 against axial displacement. The inner surface of the liner sections has a coating of vitreous enamel to provide a hard smooth wear surface for the cable to slide upon.

During the operation of the cable-stranding apparatus, the distributor carriage 90 is reciprocated by the traversing screws 93 parallel to the axis 41 of the reel 40 from a lower position disposed a predetermined distance below the horizontal axis 38 as shown in Fig. 2 to an upper position disposed a corresponding distance above the axis. During the reciprocation, the cable-distributing carriage 90 carries with it the distributing member 74 and the tubular guide section 71. The distributing member 74 supports the tubular section 71 in fixed relation thereto and to the carriage 90 during each traverse for guiding the cable therethrough tangent to the cable-supporting surface on the reel (Figs. 1 and 3) and for movement of the cable in a direction substantially parallel to the heads of the reel 40 (Figs. 2 and 4).

One end of the main tubular section 70 of the composite cable-guide tube 69 being pivotally connected to the tubular section 71 is reciprocated therewith causing the main tubular section 70 to be oscillated with the ball member 117 about the center 72 of the ball and socket joint 118. The pivotal mounting of the tubular section 71 in the distributing member 74 by means of the trunnions 91 precludes rotation of the tubular section 71 about its longitudinal axis and the main tubular section 70 being pivotally connected to the section 71 by the pins 135 is likewise held against rotation about its longitudinal axis. It will be noted that the tubular sections 70 and 71 of the composite cable-guide tube 69 are movable relative to each other about the pivotal axis 136 in a plane which passes through the center 72 of the ball and socket joint 118 and the axis of the trunnions 91 of the distributing member 74 and which is disposed parallel to the axis 41 of the reel 40.

The slidable telescoping connection between the other end of the main tubular section 70 and the sleeve 116 of the ball member 117 permits longitudinal movement of the tubular section 70 within the sleeve 116 as the distributing carriage 90 is reciprocated. At the end of each traverse of the distributing carriage 90, the distributing member 74 is actuated one step to the right as viewed in Fig. 5 to initiate the winding of a new layer of cable onto the previous one. During successive outward steps of the distributing member 74, one end of the composite guide tube 69 is advanced successively therewith to direct the cable tangentially onto successive layers of cable on the reel.

The ball and socket joint 118 permits universal movement of the ball member 117 about the center point 72 on the horizontal axis 38. In addition to providing for the universal or swivel movement of the ball member 117 incident to the reciprocation of the distributing cradle 90 and the successive lateral movements of the distributing member 74, the ball and socket joint 118 and the telescoping connection between the sleeve 116 of the ball member 117 and the tubular section 70 provide for limited oscillatory movement of the ball member 117 about the longitudinal axis of the main tubular section 70 to permit the ball member 117 to turn about said axis to various positions in response to the forces applied thereto by the cable 36 as the cable passes over the lower roller 128 (Fig. 2) during the cable-winding operation. As the cable 36 is advanced along the horizontal axis 38 into the ball member 117, it is directed between the two rollers 128 into engagement with the lower roller and is supported and guided thereby into coaxial alignment with the tubular section 70. The cable 36 is directed between the rollers 137 and is supported thereby and directed therefrom into coaxial alignment with and through the tubular section 71 onto the cable-supporting surface of the reel 40. As the distributing carriage 90 moves from one end to the other of its traverse, the cable will engage and be supported by one roller 137 during substantially one-half of the traverse and will engage and be supported by the other roller 137 during substantially the remaining half of the traverse.

Referring again to the ball and socket joint 118, the ball member 117, being free to rotate about the longitudinal axis of the main tubular section 70, will oscillate about said axis in response to the lateral pressures of the cable thereon in a direction substantially radially from the horizontal axis 38 and in a variable plane passing through the horizontal axis 38 and the longitudinal axis of the tubular section 70 to cause the rollers 128 to move with said plane about the horizontal axis as the tubular section 70 changes its angular position about the horizontal axis during the distribution of the cable 36 onto the reel.

With the present cable-guide device, the cable is held against whipping and is guided through gentle curves as it changes its path from one direction to another during the cable-distributing operation.

It is to be understood that the above-described arrangements are simply illustrative of the application of this invention. Numerous other arrangements may be readily devised by those skilled in the art which embody the principles of the invention and fall within the spirit and scope thereof.

What is claimed is:

1. In an apparatus for forming cable along a first axis and including a reel for winding the cable thereon, a cradle mounted for rotation about said first axis for supporting said reel with the axis of said reel disposed at right angles to said first axis, and cable-distributing means on said cradle including a distributing member movable in a plane perpendicular to said first axis and along laterally spaced paths parallel to the axis of said reel for directing the cable onto the reel, the combination therewith of a tube for guiding the cable from a point on said first axis to said distributing member, means for pivotally connecting one end of said tube to said distributing member for movement therewith, and means for connecting the other end of said tube to said cradle for universal movement about said point on said first axis and for limited longitudinal movement relative to said point.

2. In an apparatus for forming a cable along a substantially horizontal axis and including a cradle mounted for rotation about said axis and having a hollow journal for movement of the cable therethrough, a reel mounted on the cradle for rotation therewith about said horizontal axis and with the axis of the reel disposed transversely of said horizontal axis for winding the cable thereon, and cable-distributing means on the cradle including a distributing member movable along laterally spaced paths parallel to said reel for guiding the cable thereonto, the combination therewith of a cable-guide tube for guiding the cable from said horizontal axis to said distributing member, means for pivotally connecting one end of said cable-guide tube to said distributing member for movement therewith, means for connecting the other end of said guide tube to said hollow journal for universal movement about a point on the horizontal axis and for limited longitudinal movement relative to said point, a tubular liner having a smooth hard surface for supporting the cable for movement therethrough, and means for removably securing the liner within said tube.

3. In apparatus for forming cable along a first axis and comprising a reel for winding the cable thereon, a cradle for supporting the reel with the axis of the reel disposed at right angles to said first axis, and cable-distributing means on said cradle including a distributing member movable along laterally spaced paths parallel to the axis of said reel, the combination therewith of a first tube for guiding the cable from said first axis to said distributing member, a second tube carried by said distributing member for guiding the cable onto said reel, connector means interconnecting one end each of said first and said second tubes in close proximity to each other and for movement of the cable therethrough and for relative pivotal movement between said tubes, a hollow member telescopingly engaging the other end of said first tube for supporting said first tube for rotary and longitudinal movement relative thereto, and a member mounted on said cradle and cooperable with said hollow member for supporting said hollow member and said first tube for universal movement about a point on said first axis.

4. In an apparatus for forming cable along a first axis and comprising a reel for winding the cable thereon, a cradle for supporting the reel with the axis of the reel disposed at right angles to said first axis, and cable-distributing means on said cradle including a distributing member movable along laterally spaced paths parallel to the axis of said reel, the combination therewith of a first tube for guiding the cable from said first axis to said distributing member, a second tube for guiding the cable through the distributing member onto the reel, connector means interconnecting one end of each of said first and said second tubes in aligned relation and close proximity to each other and for relative pivotal movement therebetween, a hollow member telescopingly mounted on one end of said first tube for rotary and axial movement relative thereto, a member mounted on said cradle and cooperable with said hollow member for supporting said hollow member and said first tube for universal movement about a point on said first axis, roller means on said hollow member for guiding the cable for movement along said first axis and into said first tube, and roller means on said connector means at the juncture of said first and second tubes for guiding the cable for movement from said first tube into said second tube.

5. In an apparatus for stranding cable along a substantially horizontal axis and having a cradle mounted for rotation about said axis, a cable take-up reel mounted on the cradle with the axis of said reel disposed at right angles to the horizontal axis, and means for distributing the cable onto the reel including a distributing member movable in a plane perpendicular to the horizontal axis and along laterally spaced paths parallel to the axis of said reel, the combination therewith of a composite cable guide for guiding the cable from said horizontal axis through the distributor member onto the reel comprising a hollow first section, a tubular second section, a tubular third section, said first and said second sections being mounted in telescoping relation to each other for relative longitudinal and rotational movement therebetween, means for supporting the first section on the cradle for universal movement about a point on the horizontal axis, means for supporting the third tubular section on the distributor member for movement therewith and for pivotal movement about a third axis parallel to the axis of said reel, and means for connecting said second tubular section and said third tubular section with one end of each in alignment and close proximity to each other and for relative pivotal movement therebetween along a plane through said third axis and said point on said horizontal axis.

6. In an apparatus for stranding cable along a substantially horizontal axis and including a cradle mounted for rotation about said axis, a cable take-up reel mounted on the cradle with the axis of said reel disposed at right angles to the horizontal axis, and means for distributing the cable onto the reel including a distributing member movable in a plane perpendicular to the horizontal axis and along laterally spaced paths parallel to the axis of said reel, the combination therewith of a composite cable guide for guiding the cable from said horizontal axis through the distributor member onto the reel comprising a hollow first section, a tubular second section, a tubular third section, said first and said second sections being mounted in telescoping relation to each other for relative longitudinal and rotational movement therebetween, means for supporting the first section on the cradle for universal movement about a point on the horizontal axis, means for supporting the third section on the distributor member for movement therewith and for pivotal movement about a third axis parallel to the axis of said reel, means for connecting said second section and said third section with one end of each in alignment and close proximity to each other and for relative pivotal movement therebetween along a plane through said third axis and said point on said horizontal axis, roller means on said first section for guiding the cable for movement from said horizontal axis into said second section, and roller means on one end of said second section for guiding the cable for movement from said second section into said third section.

7. In an apparatus for forming cable along a first axis and having a cable take-up reel, a cradle mounted for rotation about said axis for supporting the reel with the axis of the reel disposed at right angles to said first axis, and cable distributing means on said cradle movable through laterally spaced paths parallel to the axis of said reel for guiding the cable onto the reel, the combination therewith of a composite guide tube for guiding the cable from a point on said axis to the distributing means comprising a pair of articulated tubes including a relatively short tube mounted for movement with said cable distributing means and a relatively long tube extending from the short tube toward said point on said first axis, and means for connecting one end of the long tube to said cradle for universal movement about said point and for limited longitudinal movement relative thereto.

8. In an apparatus for forming cable along a first axis and including a reel for winding the cable thereon, a cradle for supporting the reel with the axis of the reel disposed at right angles to said first axis, a carriage on said cradle, means for moving said carriage in a plane perpendicular to said first axis and along a path parallel to the axis of said reel, a cable distributing member mounted on said carriage and movable therewith and also movable in a plane normal to the first axis and in a direction normal to the path of movement of said carriage, and means for moving said member, the combination therewith of a cable guide tube pivotally connected at one extremity to said member, and means for connecting the opposite extremity of said cable guide tube to said cradle for universal and longitudinal movement about a point on said first axis to permit the cable guide tube to follow the movement of said carriage and to follow the movement of said cable distributing member with respect to said carriage.

References Cited in the file of this patent

UNITED STATES PATENTS

| 1,295,224 | Smith et al. | Feb. 25, 1919 |

FOREIGN PATENTS

| 821,666 | Germany | Nov. 19, 1951 |